United States Patent [19]

Carson et al.

[11] 4,029,511

[45] June 14, 1977

[54] COMPOSITION FOR USE IN MANUFACTURE OF MOLDED HOLLOW RUBBER ARTICLES

[75] Inventors: Malcolm E. Carson, Cleveland; William M. Ellslager, South Euclid, both of Ohio

[73] Assignee: Kalcor Coatings Company, Inc., Willoughby, Ohio

[22] Filed: Feb. 26, 1976

[21] Appl. No.: 661,727

[52] U.S. Cl. .................. 106/38.22; 106/38.23; 252/28; 252/49.8; 427/133
[51] Int. Cl.² ............................................. B28B 7/36
[58] Field of Search .......... 106/38.22, 38.24, 38.7, 106/285, 291, 38.23; 252/28, 32.5, 49.5, 49.8; 427/133

[56] References Cited

UNITED STATES PATENTS

| | | | |
|---|---|---|---|
| 3,052,629 | 9/1962 | Morrow et al. | 106/38.22 |
| 3,213,024 | 10/1965 | Blake et al. | 106/38.22 |
| 3,872,038 | 3/1975 | Adams et al. | 106/38.22 |
| 3,933,658 | 1/1976 | Beiswanger et al. | 252/32.5 |

*Primary Examiner*—Lorenzo B. Hayes
*Attorney, Agent, or Firm*—Milton Zucker

[57] ABSTRACT

A composition is described for coating the inside surfaces of tire carcasses and other hollow rubber articles prior to curing so as to prevent adhesion between the carcass and the pressure bag during the cure stage, comprising a sprayable film formed from an aqueous dispersion containing about 40 to 50% of finely ground mica, a small amount of volatile hydrocarbon, about 4 to 10% of an alkyl acid phosphate and sufficient surfactant to keep the composition from separating.

2 Claims, No Drawings

COMPOSITION FOR USE IN MANUFACTURE OF MOLDED HOLLOW RUBBER ARTICLES

BACKGROUND OF THE INVENTION

This invention is concerned with compositions useful in the molding and curing of automobile tire carcasses and similar hollow rubber articles and is directed particularly at compositions useful to prevent adhesion of the interior of the tire carcass to the pressure bag used in conjunction with the mold.

In the manufacture of automobile tires, uncured rubber is compounded with a variety of agents built into a carcass with desired reinforcing fabric, synthetic fibers, fiber glass roving or metal strands in various configurations. The raw carcass is then cured in a mold; the inside of the raw carcass must be coated with a release film to prevent adhesion of the carcass to the pressure bag during the curing operation, conducted at fairly high temperatures with the carcass under pressure. During the curing operation, an air bag is placed inside the carcass and is inflated to apply the desired pressure to force the carcass into intimate contact with the mold which corresponds to the trend to be imparted to the finished tire. It is necessary that a film of some material be placed between the interior of the raw carcass and the air bag to prevent adhesion of the carcass interior to the air bag. This has been done in the past by spraying the inside surface of the tire carcass with a release coating comprising a dispersion of mica in a silicone containing formulation. Because of the raw materials used, these coatings are expensive and they have two major disadvantages. The first and most objectionable problem with these release coatings which contain silicone is that, where the carcass needs some repair after curing, it is extremely difficult to apply more compound over the interior surface and get adequate adhesion. It is necessary to first completely dissolve away the release coating — a time-consuming, expensive operation. The second problem is that the pressure bags accumulate deposits which build up, so that they must be cleaned after a certain number of molding cycles. This invention aims to overcome both the repair and build-up problems connected with silicone release coatings, while at the same time providing good release at substantial cost savings.

STATEMENT OF THE INVENTION

We obtain these results by the use of a sprayable mold release coating consisting essentially of an aqueous dispersion of about 40 to about 50% (based on entire coating weight) of mica in a nominal particle size range of about 160 –325 standard U.S. mesh sieve, about 4% to about 10% of an aklyl acid phosphate in which the aklyl group contains at least 8 to about 18 carbon atoms, about 2 to 10% of a volatile hydrocarbon, preferably about 5 to 10% of a nonaromatic petroleum distillate, and sufficient surfactant to keep the composition homogeneous, the entire composition being at a pH of about 4.5 to 5.0.

DETAILED DESCRIPTION OF THE INVENTION

In the molding of tires, the inside of the uncured carcass is coated with a release agent to prevent adhesion, during curing, of the inside of the carcass to the air bag, which is inflated to keep the carcass under pressure in contact with the tire mold during the curing cycle. It is desirable that the coating be capable of rapid spray application to ensure a uniform effective film of release agent over the entire inner surface of the carcass, wherever it comes into contact with the air bag.

The mold release coating of this invention is essentially an aqueous dispersion of mica, an alkyl acid phosphate and volatile hydrocarbon containing the correct proportions of the various ingredients to ensure that the coating forms a film over the carcass interior which is sufficiently uniform to ensure complete coating of the carcass and provide a film thick enough to prevent spot adhesion, which will occur if the uncured rubber in the carcass is in contact with the cured rubber of the air bag during the cure.

To obtain this desired result, it is necessary that the composition comprises an aqueous dispersion containing from about 40 to about 50% of ground mica. If less than about 40% is used, the film applied in a standard spraying operation is too thin. Obviously, a thicker film could be obtained by spraying more slowly or by spraying a second coat — but either alternative involves costs both in time and the probability of extra cost due to excessive film build-up. Above about 50% of mica, the physical characteristics of the dispersion become undesirable for spray application.

The mica should be in a particle size range of 160 to 325 standard U.S. mesh sieve. Too many coarse particles cause film discontinuities; if the mica is too fine, application difficulties ensue.

The mica is preferably dispersed in water containing some surfactant to aid in the dispersion. Generally speaking, anionic and nonionic surfactants can be used to aid in the dispersion. However, they are not essential elements in the composition, being used primarily to reduce the cost of the dispersion process. The mica dispersion may be further improved by adding small amounts of water-dispersible high polymers to the dispersion— for example, cellulose derivatives such as methylcellulose, hydroxypropyl methylcellulose, carboxy methylcellulose, hydroxyethyl cellulose, starches, natural gums and the like. These materials, like surfactants, are used in minor quantities to get desirable viscosity control at minimum costs.

A second essential ingredient of the composition is an alkyl acid phosphate, in which the alkyl group contains at least 8 carbon atoms. The compounds may be monoesters, diesters or combinations thereof, and are available commercially, using all the commercial alcohols. Such esters with alkyl groups containing up to 18 carbon atoms are available, and all of them are useful which contain 8 or more carbon atoms.

As with the mica, there are critical limits on the amounts of alkyl acid phosphate. At least about 2% is necessary to get satisfactory release; amounts in excess of 10% are undesirable, both from cost considerations and for getting optimum uniformity of results.

The third ingredient of the composition is a volatile hydrocarbon, whose function seems to be to wet out the unvulcanized rubber in the tire carcass and thus ensure proper distribution and adhesion of the film. With aromatic hydrocarbons, as little as 2% is effective. However, since aromatic hydrocarbons are undesirable because of their pollutant effect and their potential toxicity, we preferably use liquid volatile non-aromatic petroleum distillates in a range of 5 to 10% of the weight of the entire composition. Liquids as highly volatile as the hexanes and octanes may be used, or as difficultly volatile as the kerosenes; they are all readily evaporated by the heat of the tire molding operation.

Cleanest results are obtained with the various naphthas used in the paint industry, in the 300°–400° F. boiling range. Since the composition is aqueous, a surfactant is desirable to ensure proper blending of the hydrocarbon with the system. Surfactants which produce an oil-in-water emulsion should be used.

The compositions of this invention are preferably produced by dispersing the mica in water, separately dissolving the alkyl acid phosphate and surfactant in the hydrocarbon, and blending the two by adding the phosphate-surfactant-hydrocarbon solution to the mica dispersion, adjusting the pH and body of the compositon with aqueous ammonia, amines, or other soluble alkalis such as caustic soda, to a final pH of about 4.5 to 5.0 and to desired spraying viscosity. This is generally about 2000 to 4000 centipoises at ambient spraying temperatures, most preferably 3000 to 3500 centipoises. The pH control is essential. At high pH, the composition tends to stratify, so that it requires stirring during use; at low pH, the composition becomes too thin for adequate film building under desirable spraying conditions.

Conventional antifoaming agents may be added to the composition to eliminate the necessity for deaerating the composition after dispersion and mixing operations. They are not essential ingredients, being useful to minimize production expense.

The following typical example of the invention is given by way of illustration and not by way of limitation:

| A. | Mica Dispersion Ingredients | Parts by Weight |
|---|---|---|
| | 1. Water | 365 |
| | 2. R & H Tamol 850 (Sodium salt of a carboxylated polyelectrolyte - 30% aqueous solution) | 5 |
| | 3. R & H Triton CF-10 (Alkylaryl polyether - 100% active nonionic, 60% by weight ethylene oxide, HLB of 14) | 5 |
| | 4. Ultra Adhesives Dee Fo 97-2 (Antifoam agent-typical product is a blend of emulsified mineral oils, silica derivatives and esters. Does not contain silicone compounds or derivatives | 2 |
| | 5. Mica - water ground 325 mesh | 440 |
| | Mixed well with above to obtain a uniform dispersion. | |
| B. | Dispersion Ingredients | Parts by Weight |
| | 1. Engelhard Attagel 40 (Attapulgite clay) | 5 |
| | 2. Union Carbide Cellosize QP-100M-H (Hydroxyethyl cellulose) | 1.25 |
| | 3. Water | 43.75 |
| | Mixed so as to obtain a uniform dispersion. | |
| C | Dispersion Ingredients | Parts by Weight |
| | 1. Witco PS-400 (Mixed mono-dialkyl ($C_8$–$C_{10}$) acid phosphate, about half mono and half diester) | 40 |
| | 2. Olin B-150 (Nonylphenoxy polyethanol, 100% active nonionic, 44% by weight ethylene oxide, HLB of 8.8 | 7.5 |
| | 3. Antifoam agent (same as A.4 above) | 2.0 |
| | 4. Petroleum naphtha or mineral spirits (boiling range 320–360° F.) | 70 |
| | Mixed well so as to obtain an uniform dispersion. | |

Dispersion B was added to the Mica Dispersion A while mixing; this mixture was added to Dispersion C while stirring well. The pH of the finished material was adjusted to between 4.5 and 5.0 with 28% aqueous ammonia; this required 12.0 parts by weight. The product had a viscosity of about 3000 centipoises at 20° C. It gave excellent results when used to coat the interior of raw tire carcasses prior to molding and curing. On our extensive test run, in a tire plant, uniform coating was obtained, the cured tires separated from the air bag without sticking. Injured carcasses could be repaired without removal of the coating. The air bags and tire molds came out of the operation clean, with no accumulation of coating, so they could be re-used immediately.

As indicated above, this example can be modified extensively so long as the essential ingredients and proportions of properly sized mica, alkyl acid phosphates with 8 to 18 carbon atom alkyls, and volatile hydrocarbon are used, and the proper pH is attained, all as defined in the claims.

We claim:

1. A composition useful as a coating for the inside of pressurebag-molded hollow rubber articles during the final molding and curing operation, consisting essentially of an aqueous dispersion of 40 to 50% (based on entire composition weight) of mica of a particle size between 160 and 325 U.S. standard mesh, 4 to 10% of an alkyl acid phosphate in which the alkyl group contains 8 to 18 carbon atoms, 5 to 10% of a volatile non-aromatic hydrocarbon petroleum distillate, and sufficient surfactant to keep the composition homogeneous, the entire composition being at a pH of 4.5 to 5.0.

2. The composition of claim 1, in which the composition has a viscosity of 2000 to 4000 centipoises at 20° C.

* * * * *